UNITED STATES PATENT OFFICE.

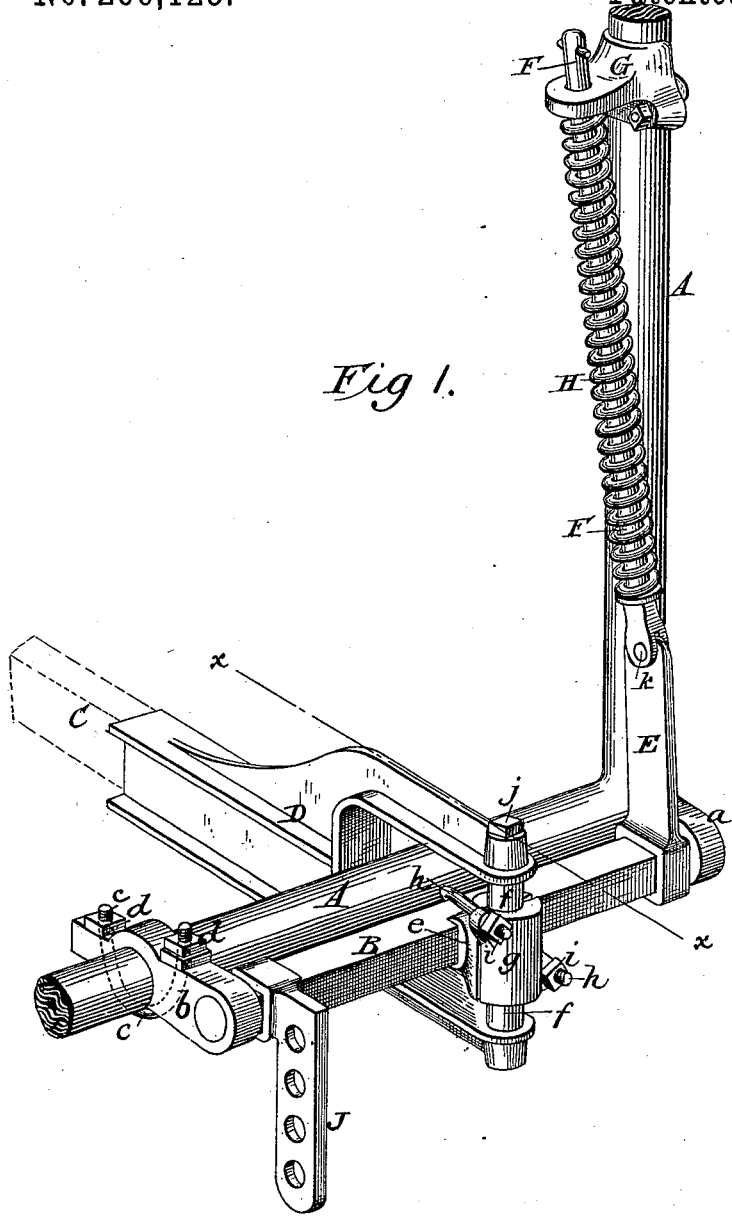

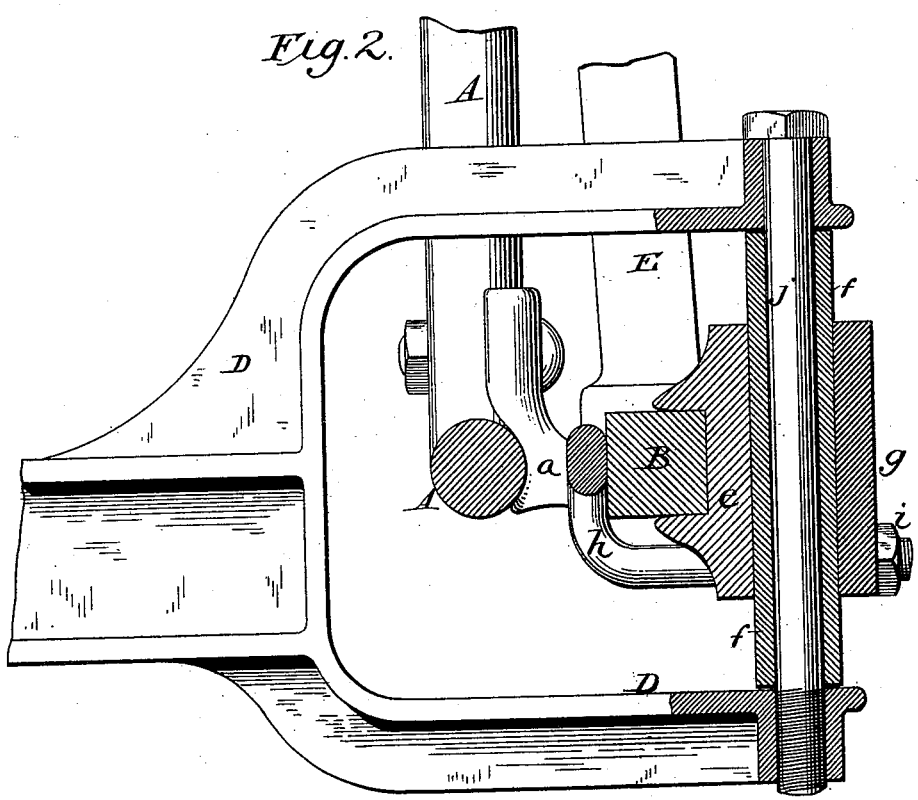
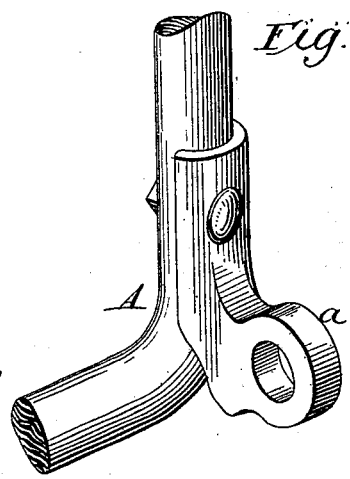

WILLIAM EVANS, OF MOLINE, ILLINOIS, ASSIGNOR TO THE MOLINE PLOW COMPANY, OF SAME PLACE.

CULTIVATOR.

SPECIFICATION forming part of Letters Patent No. 266,123, dated October 17, 1882.

Application filed June 29, 1882. (No model.)

*To all whom it may concern:*

Be it known that I, WILLIAM EVANS, of Moline, in the county of Rock Island and State of Illinois, have invented certain Improvements in Cultivators, of which the following is a specification.

This invention relates to that class of wheeled cultivators and similar machines wherein a shovel or plow beam is jointed at its forward end to a draft-frame in such manner as to be capable of swinging both horizontally and vertically, and particularly to those machines wherein springs are employed, in connection with the shovel-beams, for the purpose of assisting the operator in controlling their vertical adjustments.

The invention consists in an improved manner of constructing and arranging the spring attachment, as will be hereinafter described in detail.

The invention is designed more particularly for application to what are known in the art as "walking straddle-row" cultivators, wherein a centrally-arched axle is carried by traction-wheels at its two ends and provided with a shovel-beam near each end. The accompanying illustrations show such portions of one of these machines as is necessary to show the application of my device to one side thereof.

The general construction of the machine will be readily understood by all persons skilled in the art; but in order that there may be no misunderstanding reference may be made to Letters Patent Nos. 193,912, 209,257, 190,972, and 117,803, wherein the general form and arrangement of the wheels, frame, and beams are clearly represented.

Referring to the accompanying drawings, Figure 1 represents a perspective view of one side of the main axle, commonly denominated the "arch," with my spring attachment applied thereto. Fig. 2 is a cross-section of the same on the line *x x*. Fig. 3 is a perspective view of one of the parts detached.

A represents the main axle, which will have its central portion arched or bowed upward and its ends extended horizontally to receive traction-wheels and beam-couplings, as usual. On each end of the axle I secure to its forward side, preferably at the point where the horizontal and vertical portions meet, a lug or ear, *a*, which may be welded thereon, or made in a separate piece and bolted thereto, as shown in Fig. 3.

To the outer end of the axle, just inside of the wheel, I secure a forwardly-extending plate or bearing, *b*, which may be made of any suitable form and applied in any suitable manner. It is preferred, however, as shown in the drawings, to notch or recess the rear end of this plate in order that it may fit over and around the upper side of the axle, and secure it in place by means of a stirrup-bolt, *c*, passed beneath the axle and through the arm, and provided with nuts *d* upon the upper ends, as plainly represented.

The forward ends of the parts *a* and *b* are provided with horizontal holes or openings to receive the journals on opposite ends of a rock-shaft, B, which is thus sustained in front of and parallel with the main axle, as shown in Figs. 1 and 2. To this rock-shaft I couple the draft-head of the plow-beam in the following manner: Upon the forward side of the rock-shaft I mount a plate, *e*, flanged to engage over the upper and lower edges of the shaft in order to prevent it from turning thereon. The forward side of this plate *e* is provided with an ordinary semicircular groove or recess, in which there is seated a vertical tube, *f*, held firmly but adjustably in place by means of a cap or covering plate, *g*, which is in turn secured by means of a U-shaped bolt or stirrup, *h*. This bolt *h* is passed over and around the rock-shaft B from the rear side, and its ends extended through the edges of the plate *g* and provided with nuts *i*, as shown, so that upon tightening the nuts the bolt is caused to clamp the tube *f* firmly between the plates *c* and *g*, and to hold the latter firmly in position upon the rock-shaft, thus holding the tube rigidly in position in relation to the rock-shaft.

The plow-beam C has its forward end secured rigidly to a forked coupling or draft-head, D, the two arms of which pass forward above and below the axle and the rock-shaft B from the rear side, and are connected to the upper and lower ends of the tube *f* by means of a vertical pivot-bolt, *j*, passing through them and through the tube, as shown in Figs. 1 and 2.

It will be observed that under the above arrangement the coupling-head and draft-head are permitted to swing horizontally around the bolt *j* as an axis, and that they are also permitted to swing vertically by the rotation of the rock-shaft B upon its end journals or trunnions, which revolve in the parts *a* and *b*.

It will be observed that by loosening the nuts *i* the plates *c* and *g* may be released, so as to permit the tube *f* to be adjusted vertically in order to vary the height of the forward end of the plow-beam, or of the plates and tube being adjusted lengthwise of the rock-shaft B, so as to adjust the forward end of the plow-beam horizontally.

I will now describe the spring attachment used in connection with the above parts.

To one end of the rock-shaft B there is rigidly secured an upright arm, E, which has its upper end connected by a horizontal pivot, *k*, to the lower end of an upright rod, F, the upper end of which latter passes through a guide-plate, G, secured to the vertical portion of the axle. A spiral spring, H, is mounted upon and around the rod E, bearing at its upper end against the plate G and at its lower end against a collar on the lower end of the rod. The parts are so disposed that when the plow-beam is in its operative position the rod F will stand in line or substantially in line with the axis of the rock-shaft with the spring H under strong compression. Upon elevating the beam its coupling-head causes the rock-shaft B and arm E to turn forward, whereby the lower end of the rod is also thrown forward out of line with the arm E and the rock-shaft, whereupon the spring, urging the rod forcibly downward, causes it in turn to force the arm E forward, the effect of which is to turn or assist in turning the rock-shaft B forward with sufficient force to elevate the plow-beam above its operative position. As the beam is lowered to an operative position the parts gradually resume the original position represented in Fig. 1, and as the rod is thus brought back into line with the rock-shaft its lifting effect upon the beam rapidly diminishes, so that at the time the beam again reaches an operative position the spring exerts little or no lifting strain upon it. It is preferred to so adjust the parts that as the beam reaches the operative position the pivot *k* will be thrown in rear of a line passing from the upper end of the rod E through the axis of the rock-shaft B, the effect of which will be to cause the spring to exert a slight depressing effect upon the beam, the better to hold the shovel in a working position in the ground. This arrangement of the arm to throw "past the center," so that the spring will serve both as a lifting and as a depressing spring, is not essential, but is the preferred construction.

In some cases it may be especially desirable to use a spring of such strength that it will serve, unaided by the operator, to lift the beam the instant that it is raised above an operative position. In such case I find it sometimes advisable to employ the draft or strain by which the machine is propelled to assist in keeping the beam down in its operative position. This result is accomplished by providing the rock-shaft B with a depending perforated arm, J, as clearly represented in Fig. 1. This arm is secured rigidly to the rock-shaft, and the series of holes therein admit of the single-tree or other draft device being connected thereto at a greater or less distance below the rock-shaft. When the machine is being propelled the draft-strain, acting upon the arm J, tends to resist the lifting action of the spring H and to hold the beam down in place.

It is preferred to construct the plate *g*, in which the upper end of the rod E is guided, in the form represented in Fig. 1, and to secure it to the vertical portion of the axle by a stirrup-bolt, as shown, this construction admitting of its vertical adjustment to vary the tension of the spring as may be required. It may be otherwise constructed, however, if preferred.

As regards the arrangement of the rock-shaft B, in connection with the axle and other parts, the essential feature of the invention consists in sustaining the same parallel with the axle by means substantially as described, and it is manifest that the form of the bearings *a* and *b* may be modified without departing from the limits of the invention, and also that the rock-shaft may be placed above, below, or in rear of the axle without changing its mode of action, provided it is sustained and connected with the co-operating parts in substantially the manner indicated.

I am aware that numerous cultivators have been constructed wherein a revolving sleeve or collar mounted loosely upon the main axle was coupled to the beam or draft-head, and provided with a projecting-arm co-operating with a spring.

My construction is designed as an improvement upon that above recited.

Having thus described my invention, what I claim is—

1. The combination of the axle A, rock-shaft B, the draft-head or coupling D, and the lifting-spring, arranged substantially as described, to rotate the rock-shaft.

2. In combination with the axle A, bearings *a* and *b*, the horizontal rock-shaft B, having the arm E thereon, the rod F, guide G, and spring H.

3. In combination with the main axle and the rock-shaft B, having the spring applied, as shown, to give the same a forward rotation, the draft-head D, connected to the rock-shaft by means of the tube *f*, pivot *j*, plates *c* and *g*, and bolt *i*.

4. In a cultivator, the horizontal main axle, in combination with the horizontal rock-shaft B, sustained therefrom, substantially as specified, the forked draft-head D, and the vertical axis *j*, connecting the draft-head and rock-shaft, and adjustable both vertically and laterally upon the latter by means of the clamping device, substantially as shown.

5. In a cultivator, the combination of the main axle, the independent rock-shaft mounted upon and in advance of said axle, the draft-head passing loosely around the axle and jointed to the rock-shaft, and the spring attachment, substantially as shown, connected with the rock-shaft for the purpose of turning the same forward.

6. In combination with the main axle and the supplemental rock-shaft B, the draft-head jointed to said rock-shaft, substantially as shown, and the depending arm J, connected rigidly to said rock-shaft.

7. In combination with the angular horizontal rock-shaft B, the beam connection or coupling consisting of the forked draft-head D, flanged plates $c$ and $g$, tube $f$, bolt $i$, and pivot $j$.

8. In a cultivator, the combination, with the axle or arch A, of the supplemental rock-shaft B, sustained substantially as described, and provided with one or more projections adapted to operate, as described, with a spring, weight, or draft device.

WILLIAM EVANS.

Witnesses:
EUGENE LEWIS,
J. W. WARR.